Sept. 13, 1960 E. KNECHT 2,952,160

RECORD CHANGER

Original Filed Nov. 19, 1953

Inventor:

EMIL KNECHT

BY [signature]

ATTORNEY 2,952,160

RECORD CHANGER

Emil Knecht, Sarnen, Switzerland

Original application Nov. 19, 1953, Ser. No. 393,135, now Patent No. 2,902,285, dated Sept. 1, 1959. Divided and this application Feb. 28, 1958, Ser. No. 718,282

9 Claims. (Cl. 74—200)

Figures 1, 2:
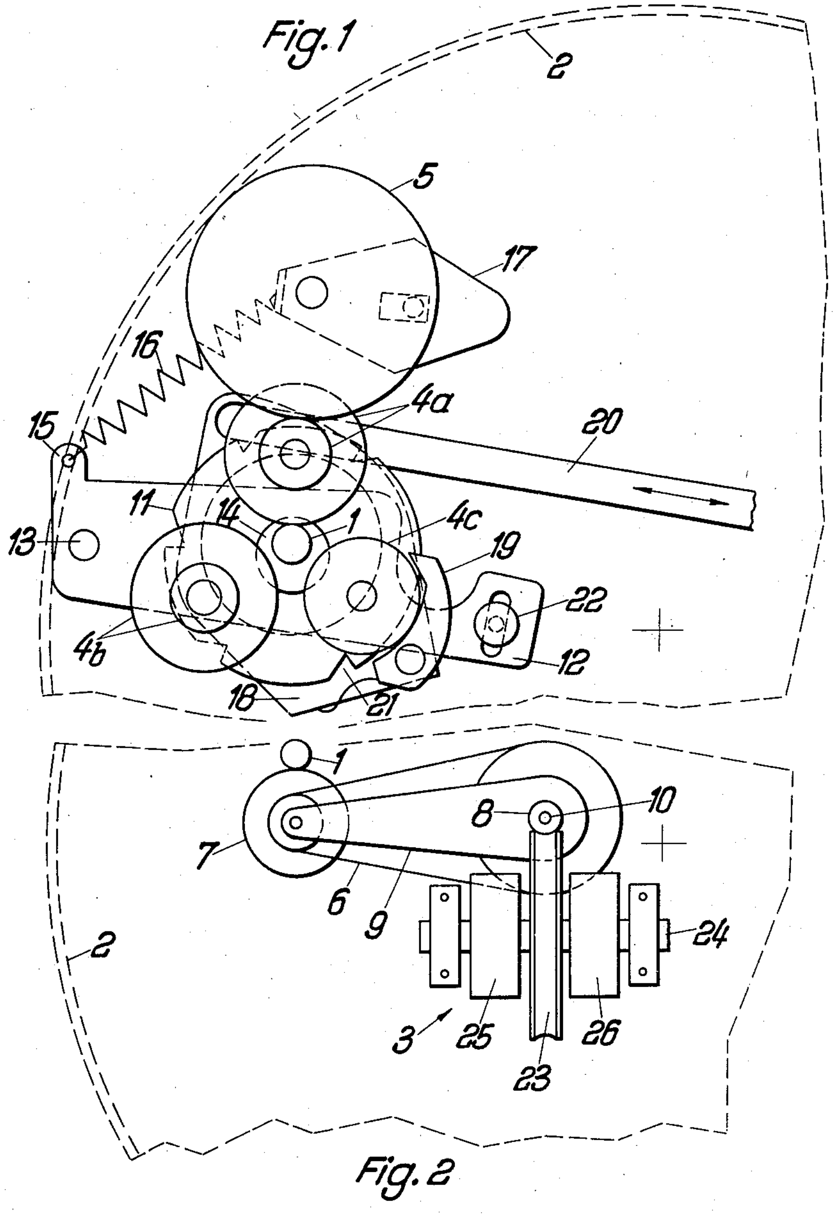

The instant invention relates to record players in which the turntable is driven by way of a variable speed transmission at different speeds per unit of time for properly reproducing the sound from the records, and more particularly to the record changers of such players.

This is a divisional application divided out of my application for patent, Serial Number 393,135, filed November 19, 1953, and now Patent No. 2,902,285.

With the advent of sound records adapted to be played, for example, at speeds of 33⅓, 45 and 78 revolutions per minute respectively, there has arisen the problem that the time interval for changing records playable at the slower speeds is longer than that for records playable at the higher speeds, since the drive of the record changing mechanism, as also of the control means actuating the tone arm between playings, is generally from the turntable spindle or drive shaft.

An object of the instant invention is to provide a record player for records playable at one of a plurality of speeds of which player the record changing mechanism and the tone arm movement control mechanism operate at a constant speed, that is, the same time is taken to change a record no matter at what speed the turntable must turn to properly reproduce the sound on the records.

Another object is to provide a record player in which the record changer operates at constant speed while the turntable may rotate at any one of a plurality of speeds, in which the coupling from the driving shaft to the turntable is by way of a variable speed transmission composed exclusively of friction rollers or wheels and the coupling from such driving shaft to the record changer and tone arm control mechanism is also by friction rollers or wheels.

Still another object is to provide a record player of simple and compact constructions in which the speed at which the turntable is driven is adjustable independently of the speed at which each of the record changing mechanism and the mechanism controlling the movement of the tone arm during periods other than playing periods, is driven.

I accomplish the foregoing, and other, objects of my invention by including in the drive connection to the player turntable a speed changing mechanism or transmission consisting exclusively of friction rollers or wheels connecting directly to, and eccentrically engaging, the turntable. Similarly the motor or driving shaft is connected by a friction coupling to the drive of the record changing and tone arm movement controlling mechanism. Such friction coupling assures operation free of disturbances and, as compared to a discontinuous and toothed coupling, is readily constructed as a releasable or cut-off coupling for the speeds involved in record players. Driving the turntable eccentrically of its shaft or spindle permits the use of a relatively weak but high speed motor as compared to the slow but more powerful motors heretofore required. In addition, this simple type of change speed mechanism may have any number of steps, as may be desired. The friction wheels of the speed changer assure maximum uniformity and smoothness of turntable movement together with elimination of disturbing vibrations in the audio frequency range, enabling improvement in the quality and fidelity of the reproduction. It must also be noted that the disposition of the variable speed transmission eccentrically below the turntable makes for economy of manufacture and results in a neat and compact assembly. Finally, this friction wheel transmission is practically completely free of adverse effects due to wear since the abrasion between cooperating friction wheels is negligibly small. I dispose my driving electrical motor, and the drive shaft, vertically and engage the variable speed transmission to a cylindrical, circumferential or flanged, surface of the turntable, thereby further conserving space. By such disposition of the driving shaft and motor, and the speed changing transmission, the transmission of shocks from the motor or to the turntable and the sound reproducing system is substantially eliminated, and also represents the most favorable drive connections, as a practical matter, from the motor. These advantages obtain even though the speed transmission has any number of stages greater than those shown in the drawing.

The subject matter of the invention will be clearly understood from the following description of an illustrative embodiment thereof taken in conjunction with the appended drawing, in which:

Figure 1 is a plan view of the variable speed transmission for the turntable of the record player in accordance with the invention with the turntable thereabove shown in dashed lines and partially broken away; and Figure 2 is a plan view of the constant speed coupling between the drive shaft and the mechanism controlling the record changing and the tone arm movement at periods other than the playing intervals, also with the turntable thereabove shown in dashed lines and partially broken away.

Referring to the drawing, the drive comprises a friction wheel 1 integrally on the shaft of the driving electric motor (not shown), which wheel drives both the turntable 2 and the control mechanism 3. Turntable 2 is driven by three coupling friction wheels, *4a, 4b, 4c*, selectively engageable to driving friction wheel 1, and an intermediate friction wheel 5. Control mechanism 3 is connected to driving friction wheel 1 by way of a friction wheel and belt drive, belt 6 being about the smaller step of friction wheel 7 engaging the driving wheel 1, to drive the transmission worm 8 supported on rocker member 9 which is tiltable about shaft 10. Stepped friction wheels *4a, 4b, 4c* are of different sizes and arranged in planetary manner rotatably supported on rotatable disc 11, which defines a central aperture about the drive shaft and the friction drive wheel 1. By rotation of the disc 11 as below described, the successive friction wheels *4a, 4b, 4c* are engaged with friction driving wheel 1 and to the intermediate friction wheel 5, so that, in accordance with their different circumferences, wheels *4a, 4b, 4c* transmit different speed ratios. Friction wheels *4a* and *4b* are provided with two steps and engaged by their larger steps with driving wheel 1 and with their smaller steps, respectively to the intermediate friction wheel 5. Thus friction wheel *4a* has such dimensions that on its operative insertion in the drive of the turntable, the latter rotates at 45 r.p.m., friction wheel *4b* being assigned for a speed thereof of 33⅓ r.p.m., and friction wheel *4c* a turntable speed of 78 r.p.m. Rotatable disc 11 is rotatably supported on a rocker plate 12, which in turn is pivoted at 13 to the player frame or body and defines an aperture 14 central thereof about the drive wheel 1. A projecting arm 15, integral with rocker plate 12, is connected by a tension spring 16 to a plate 17 slidable and pivotally supported on the player body or frame, which plate 17 rotatably supports the intermediate wheel 5.

Selectively to engage friction wheels *4a*, *4b*, *4c*, to drive wheel 1, a step-by-step switching mechanism is provided consisting of a pivotable switch plate 18 having a spring pressed pawl 19, a switch lever 20 manually reciprocable as shown by the arrows in Figure 1 and connected to the switch plate 18 and a plurality of notches 21 spaced peripherally on rotatable disc 11 into which the bias of pawl 19 tends to engage the nose of the pawl. In the instant embodiment, six notches 21 are provided so that for each change of speed, two switching steps are required.

In each switched position of the variable speed transmission, tension spring 16 serves to press the particular friction wheel, *4a*, *4b*, *4c*, engaged and coupled at the time, against friction drive wheel 1, as also to make certain the intermediate wheel 5 rests, under spring tension, against coupling wheel *4a*, *4b*, *4c*, at the time engaged as also against the rim of the turntable 2.

To change the speed of the turntable, switch plate 18 is pivoted by lever 20. When lever 20 is drawn to the right in Figure 1, which may be manually but preferably by a spring return, the switch plate 18 is tilted clockwise on completion of this movement to the right, the pawl 19 enters the next succeeding notch 21. On pushing lever 20 to the left pivotable plate 18 is tilted counterclockwise, thereby causing switching pawl 19 to rotate the disc 11 in counterclockwise direction about 60°. Thus disc 11 has rotated one-sixth a turn and the coupling wheel, *4a* for example in Figure 1, is released from its engaging position shown so that intermediate wheel 5, under the tension of spring 16, is removed from the rim of turntable 2 by pivoting or tilting plate 17 counterclockwise while simultaneously rocker plate 12 is pivoted or tilted clockwise until it strikes stop 22. On the succeeding and second switching action by drawing the lever 20 to the right and thereafter pushing it to the left, disk 18 is rotated another one-sixth turn and wheel *4c* engages friction drive wheel 1 and intermediate wheel 5, while simultaneously intermediate wheel 5 is again engaged to the rim of the turntable.

Control mechanism 3 has a worm gear 23 meshing with worm 8. Shaft 24 supports a pair of cams 25 and 26, which, in manner known per se, control the record changing mechanism and the movement of the tone arm. Rocker plate 9 enables engaging or releasing the coupling drive wheel 1 and controls mechanism 3. The arrangement is such that after a record is played, and preferably also each time the drive motor is energized, the coupling between the motor shaft wheel 1 and control mechanism 3 is closed, while decoupling therebetween occurs just as soon as the tone arm has been lowered onto the record to be played. Decoupling also takes place after the last record has been played and the tone arm has reached its outermost position, and preferably with the deenergization of the motor by the now idling record changing mechanism. Cams 25 and 26 are so arranged that the control drives are adjustable and adjusted to the desired record diameter at the time. Such adjustment is readily obtainable by push buttons or positionable levers.

The drawing clearly shows that the control mechanism 3 is always driven at the same speed of rotation by the drive motor. Hence the changing of records, as also the movement of the tone arm, is independent of the turntable speed at any particular time and each always operates at the same speed, that is, the time interval therefore is constant.

What I claim is:

1. A variable speed phonograph with a constant speed record changer and tone arm movement controller mechanism comprising a constant speed drive shaft, a turntable, a speed changer adapted selectively to drive the turntable from the shaft at a plurality of speeds of which speed changer all the rotatable power transmitting elements are friction wheels, manually operable means to couple the shaft to the turntable through the speed changer at a selected one of the plurality of turntable speeds, a record changing and tone arm moving mechanism drive, and friction wheel means coupling the shaft to the mechanism drive to drive the latter at a constant speed irrespective of the selected turntable speed.

2. A variable speed phonograph according to claim 1 in which the drive shaft is vertical and with the speed changer is positioned eccentrically to the axis of, and below, the turntable at a peripheral region thereof.

3. A variable speed phonograph record changer and tone arm movement controlling mechanism comprising a constant speed drive shaft, a turntable, a first friction wheel driving the turntable, a speed changer having a plurality of transmission ratios coupling the drive shaft to the first friction wheel and including a rotatable disc, a plurality of second friction wheels rotatably spaced on the disc, the effective diameters of the respective second friction wheels differing from each other in accordance with the predetermined turntable speeds, latching means maintaining the rotatable disc in a position to engage a selected second friction wheel to both the drive shaft and the first friction wheel, and means for releasing the latching means and to rotate the disc so as to disengage such second friction wheel and engage a different one of the plurality of second friction wheels and restore the latching means to the maintaining position; and a third friction wheel coupling the drive of a record changing and tone arm moving mechanism to the constant speed drive shaft in advance of the speed changer.

4. A variable speed phonograph according to claim 3 in which the drive shaft is vertical and with the speed changer and the first friction wheel is positioned eccentrically to the axis of, and below, the turntable, and the first friction wheel drivingly engages the turntable at a peripheral region thereof.

5. A variable speed phonograph according to claim 3 in which the first friction wheel is rotatably supported on a member slidable to a limited degree relative to the phonograph body and is biased by a tension spring into driving engagement with a peripheral region of the turntable.

6. A variable speed phonograph according to claim 3 in which the disc is rotatably mounted on a rocker arm pivoted to the phonograph body, the first friction wheel is rotatably supported on a member slidable to a limited extent on the phonograph body, and a tension spring interconnects the slidable member and the rocker arm to bias the first friction wheel and the selected second friction wheel into engagement with each other and the selected second friction wheel into engagement with the drive shaft.

7. A variable speed phonograph according to claim 3 in which the rotatable disc is supported on a rocker arm pivoted to the phonograph body, the latching means comprises a plurality of spaced notches in the outer cylindrical surface of the disc and a spring biased pawl engageable successively into each notch, there being a pair of notches for each second friction wheel of the plurality and a second rocker plate supports the pawl; and the latch releasing means includes a manually reciprocable lever connected to the second rocker plate so that on movement of the lever in one direction the second rocker plate is pivoted to disengage the pawl from a notch and to bring the pawl into engagement with the next succeeding notch, the engagement of the pawl with such next succeeding notch being maintained on the return movement of the lever in the direction opposite to the one direction during which interval the second friction wheel theretofore engaging the first friction wheel and the drive shaft is disengaged and the rocker arm is pivoted under the tension of a spring interconnecting the rocker arm and a slidable and pivotable support of the first friction wheel, and on a subsequent second movement of the lever in the one direction the pawl is disengaged from such next succeeding notch to engage the second succeeding notch from the originally engaged notch while on a subsequent second return movement of the lever the disc is further rotated in the same direction as on the first return movement of the lever to engage the next one of the second friction wheels to the drive shaft and the first friction wheel.

8. A variable speed phonograph having a constant speed record changing mechanism and tone arm movement control in non-reproducing intervals, comprising a constant speed drive shaft, a turntable, a first friction wheel driving the turntable, a speed changer including an annular disc, a first rocker arm rotatably supporting the annular disc, a plurality of second friction wheels rotatably spaced on the disc, each second friction wheel engaging the drive shaft and the first friction wheel on selection thereof, the diameters of the second friction wheels differing from each other in accordance with the desired speeds of the turntable, latching means maintaining the annular disc so that a selected one of the second friction wheels engages the drive shaft and the first friction wheel, and manually operable means for releasing the latching means and rotating the disc to engage a different second friction wheel to the drive shaft and first friction wheel and restoring the latching means to the maintaining position; a second rocker arm, drive means supported on the second rocker arm for the record changing and tone arm movement control mechanism and including a worm shaft, and a third friction wheel at the free end of the second rocker arm and adapted to be engaged to the constant speed drive shaft to drive said last mentioned mechanism, a cam shaft driven by the worm shaft, and a pair of cams on the cam shaft for actuating the record changing and tone arm moving mechanisms respectively at predetermined intervals.

9. A phonograph with variable turntable speeds having a record changing and tone arm movement mechanism of constant speed, comprising a turntable, a constant speed drive shaft rotated at a speed relatively high to the maximum turntable speed, a speed changer having a plurality of rotatable power transmission elements, each power transmission element being a friction wheel, manually operable means for selectively coupling one friction wheel of the plurality to the rim of the turntable and a selected friction wheel of the other wheels of the plurality to such one wheel and to the drive shaft to drive the turntable at the selected speed, a record changing and tone arm moving mechanism, and driving means including a friction wheel coupled to the shaft and reduction gearing of constant ratio coupled to the record changing and tone arm movement mechanism to drive the latter at constant speed independently of the speed at which the turntable is driven.

References Cited in the file of this patent

UNITED STATES PATENTS

| | | |
|---|---|---|
| 759,111 | Johnson | May 3, 1904 |
| 1,964,352 | Hazard | June 26, 1934 |
| 2,480,623 | Ballentine et al. | Aug. 30, 1949 |
| 2,567,092 | Williams | Sept. 4, 1951 |